(12) United States Patent
Guenther (10) Patent No.: US 6,659,697 B1
(45) Date of Patent: Dec. 9, 2003

(54) WINCH BAR

(76) Inventor: Martin Guenther, 1228 S. Spring, Independence, MO (US) 64055

( * ) Notice: Subject to any disclaimer, the term of this patent is extended or adjusted under 35 U.S.C. 154(b) by 0 days.

(21) Appl. No.: 10/146,559

(22) Filed: May 15, 2002

(51) Int. Cl.[7] .................................................. A60P 7/08
(52) U.S. Cl. ............................ 410/103; 410/77; 410/12
(58) Field of Search ............................... 410/100, 103, 410/12, 96, 97, 156; 16/110.1, 114.1

(56) References Cited

U.S. PATENT DOCUMENTS

| | | | | |
|---|---|---|---|---|
| 4,900,203 A | * | 2/1990 | Pope | 410/100 |
| 5,425,154 A | * | 6/1995 | Edwards, Jr. | 16/111 R |
| 5,433,565 A | | 7/1995 | Chan | 410/103 |
| D423,332 S | * | 4/2000 | Salter | D8/359 |
| 6,056,488 A | * | 5/2000 | Depoy | 410/100 |
| 6,092,437 A | * | 7/2000 | Summer | 16/114 R |
| 6,102,637 A | * | 8/2000 | Mocci | 410/103 |
| 6,398,470 B1 | * | 6/2002 | Mosley | 410/100 |

* cited by examiner

Primary Examiner—Joseph D. Pape
Assistant Examiner—H Gutman
(74) Attorney, Agent, or Firm—Mark Manley (57) ABSTRACT

A winch bar is provided for use in combination with a strap winding winch for flat bed trailers. The winch bar has two stable positions of engagement with the strap winch. The winch bar will reduce accidents commonly caused by slippage of the winch bar relative to the winch during application of high torque.

7 Claims, 8 Drawing Sheets

WINCH BAR

BACKGROUND OF THE INVENTION

In over the road trucking, flat bed trailers are often used to haul loads. To secure a load on a flat bed trailer it is necessary to strap a load down. For this purpose strap winches are often located around the perimeter of the flat bed, these winches allow the driver to cinch down straps from a position standing on the ground.

The strap winches usually have a cylindrical lug having holes that allow for turning the winch to wind the strap. Typically the strap is tossed over the load and the strap is secured, then the winch is turned to cinch the strap down over the load. A one way pawl in the winch keeps the strap from unwinding.

To get enough leverage the driver will commonly use a winch bar. These bars are commonly several feet long and have a tip sized to fit in the hole in the winch lug. The driver places the winch bar tip in the lug and turns the winch lug, typically turning the winch a quarter turn with each placement of the winch bar.

One problem with this arrangement has been that the winch bars are dangerous to use. The driver must place a lot of force on the bar as it is turning and it is all too common for the bar tip to slip out of the lug hole. When the bar slips, under the amount of force applied, the driver is almost always hurt . . . sometimes seriously.

Most winch bars have a slight bend just before the tip. This bend allows the driver to turn the bar about its axis to one of two positions to get a grip in a hole. This is necessary because the winches are commonly mounted right under the trailer bed and with just four holes around the periphery of the winch lug, a hole is often not in an accessible location. The bend in the tip gives the driver more access. The problem with the bend in the tip is that the bar is only stable in one position, in the other position a slight twist of the bar under load will lead to the slip accident described.

U.S. Pat. No. 5,433,565 to Chan discloses one proposed solution to the problem of the winch bar slipping out. The device to Chan uses a series of steps or notches to hold the winch bar in place against the hole in the winch lug. This solution has a couple problems. First the necked down or notched areas are going to be subject to breakage. Truckers attempt to put a lot of leverage on these bars and breakage can be a problem even without these notches. A second limitation is that these notches or necked down areas will not prevent the instability caused by a slight twist, the winch bar can still rotate relative to the hole and this rotation leads to many of the accidents. A third problem with the design of Chan is that the holes in the lug are subject to extreme crushing caused by the leverage applied. It is not unusual to have a hole as much as ¼ inch out of round, it is unclear if the shape dependent design proposed by Chan would work when the holes are not shaped correctly.

In addition to the load straps, the driver has other tasks to perform. On a flat bed trailer a tarp is often use to cover the load, the driver must position this tarp over the load. Also there are handles to release the fifth wheel and to release the axle to move the trailer wheels for different loads. All these tasks require the driver to either climb onto the trailer or to climb under it. Climbing on or under the trailer is a dangerous and difficult task. Most drivers seek ways to minimize these situations.

SUMMARY OF THE INVENTION

The present invention solves the limitations of the prior art devices. The current invention provides a winch bar with two stable positions of engagement with the winch lugs. The winch bar provides two positions of engagement with the winch lug, but the winch bar can not twist in either of these positions. The winch bar engagement is not dependent on the shape of the hole in the winch lug, so that the user will experience reliable, safe performance even where the lug holes are worn through use. The winch bar is strong, and its tip will not catastrophically fail and snap off. Further the winch bar provides a useful hook that can be applied to other jobs commonly encountered on a flatbed truck trailer such as the need to thump tires, operate the lever on the fifth wheel, operate the lever on the tandems and reach a tarp draped over a load.

DETAILED DESCRIPTION OF THE DEVICE

Figure 1:
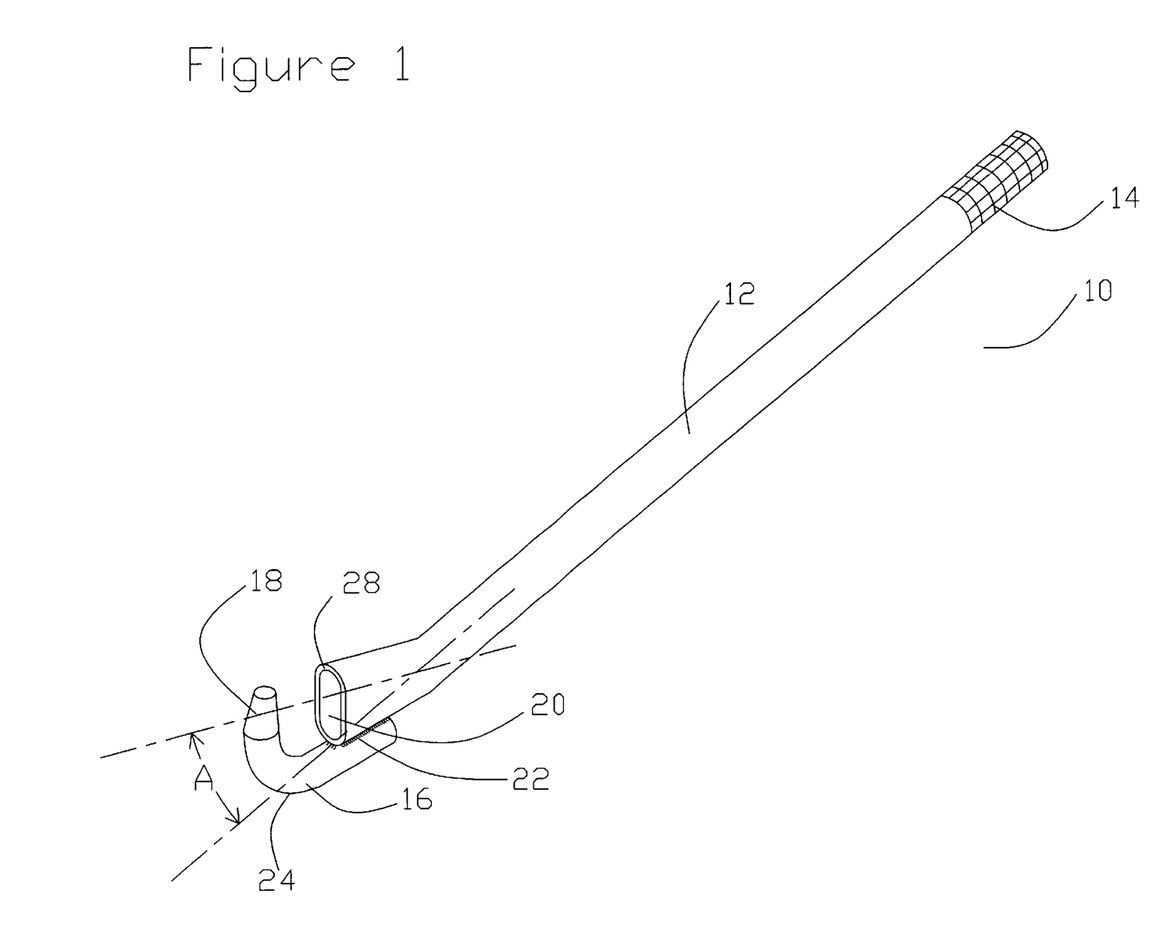
FIG. 1 Shows a view of the winch bar

FIG. 1 shows a basic view of the winch bar device (10). The bar includes an elongated handle (12) with a grip portion (14). The handle (12) has an opposite end (20) to which a tip section (16) is attached. The tip section (16) includes a reduced section (18) to aid in getting the device started in a hole. The tip section (16) also includes a bend (24) of about 90 degrees. The tip section (16) is welded (22) to the bar (12). The bar (12) is hollow near the tip section (16) and has a wall (28). The bar (12) has a circular section through most of its length but is flattened out near the tip section (16). The flattening gives the wall (28) near the tip section (16) a somewhat oval shape. As can also be seen the handle (12) near the tip section (16) has a bend of angle (A) relative to the main axis running through the length of the handle (12).

Figure 2:
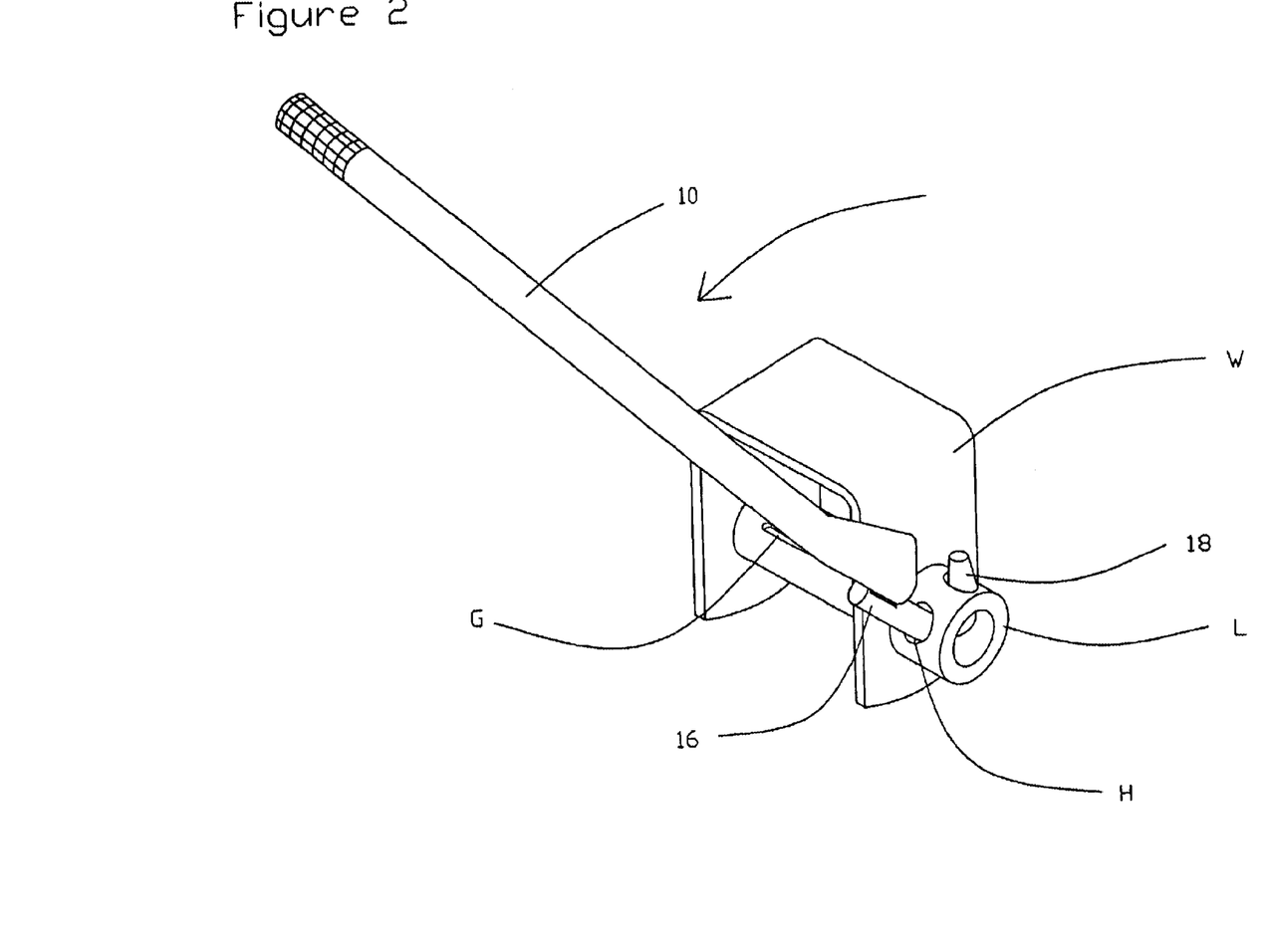
FIG. 2 Shows a view of the winch bar operating an existing winch

FIG. 2 shows a first position of engagement of the winch bar (10) relative to an existing winch (W). As can be seen the tip section (16) passes through a first hole (H) in the lug (L) and into a second hole (H) in the lug (L). The 90 degree bend in the tip section (16) allows it to hook through both adjacent holes (H). Once in this position the bar (10) is no longer free to rotate about the long axis of the handle (12), thus the bar is stable in this position and will not slip out of the hole (H) and will not rotate. FIG. 2 shows a typical groove (G) in the winch (W) where the strap would be carried. The arrow in the figure shows the direction that the user would place force on the bar (10). In this position if the tip portion (18) did not extend through the second hole (H) then the bar (10) would be free to rotate about its long handle (12) axis, and would be unstable.

Figure 3:
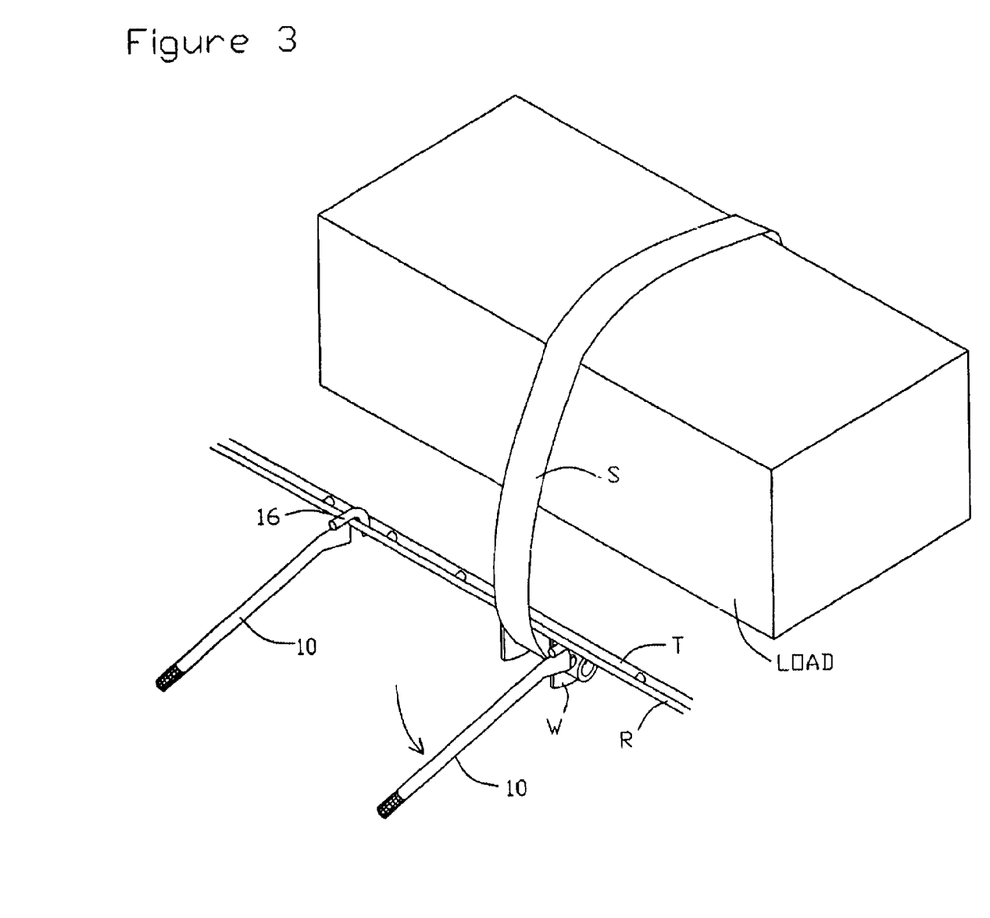
FIG. 3 Shows the winch bar in use on a trailer

FIG. 3 shows a view of an existing trailer (T) and two bars (10). One bar is shown engaged with a winch (W) and a second is shown in a resting position where the tip section (16) rests over a typical rail (R) often found on the side of a flat bed trailer (T). As can be seen the winch (W) is attached under the side of the trailer (T) and the strap (S) comes out either under or over the rail and is tied over a load (LOAD) on the trailer (T).

Figure 4:
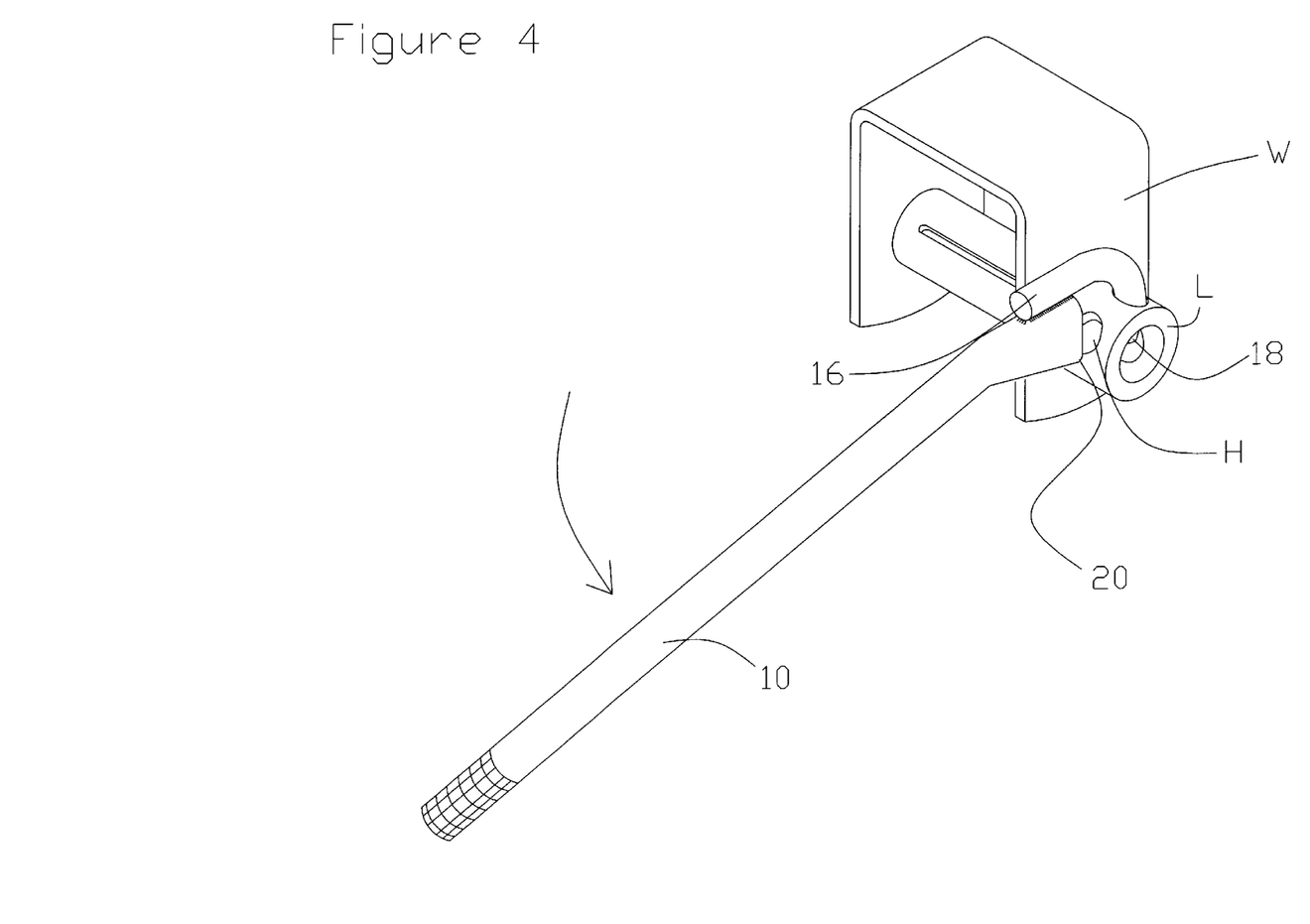
FIG. 4 Shows the second way the winch bar can engage the existing winch

FIG. 4 shows a second stable position of the winch bar (10). In this position the tip section (16) has just the end (18) engaged in a single hole (H). In this position force applied downward to the handle (12), as shown by the arrow, is below the axis running through the tip section (16), and this position is stable. In this position the end of the handle end (20) bears against the lug (L) as force is applied.

Figure 5:
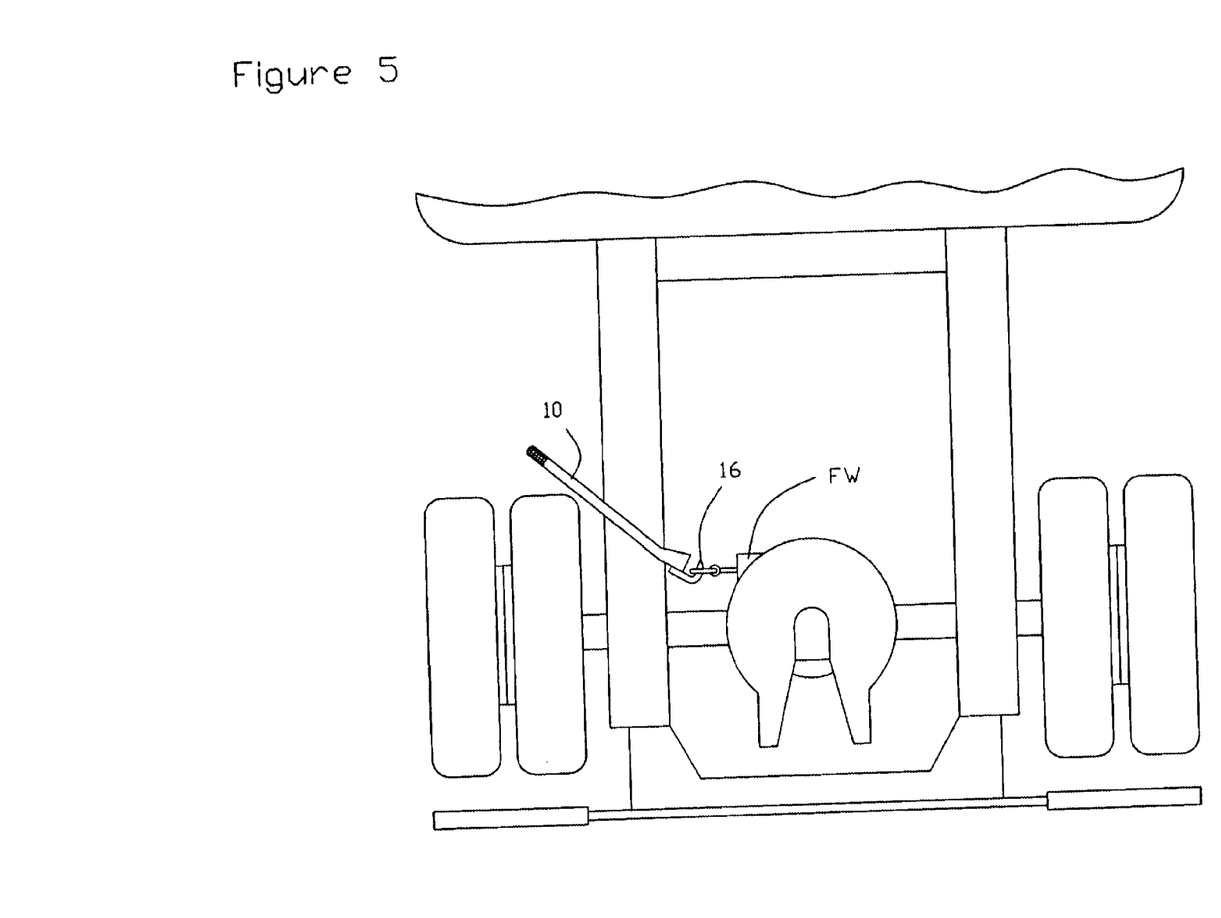
FIG. 5 Shows the winch bar pulling the fifth wheel lever

FIG. 5 shows the winch bar (10) in use to trip the fifth wheel (FW) on a semi truck. Most fifth wheels can be released with a simple pull. The hook like shape of the tip section (16) makes it useful to reach under the trailer to reach points like the fifth wheel release and the lever to release the tandems (not shown).

Figure 6:
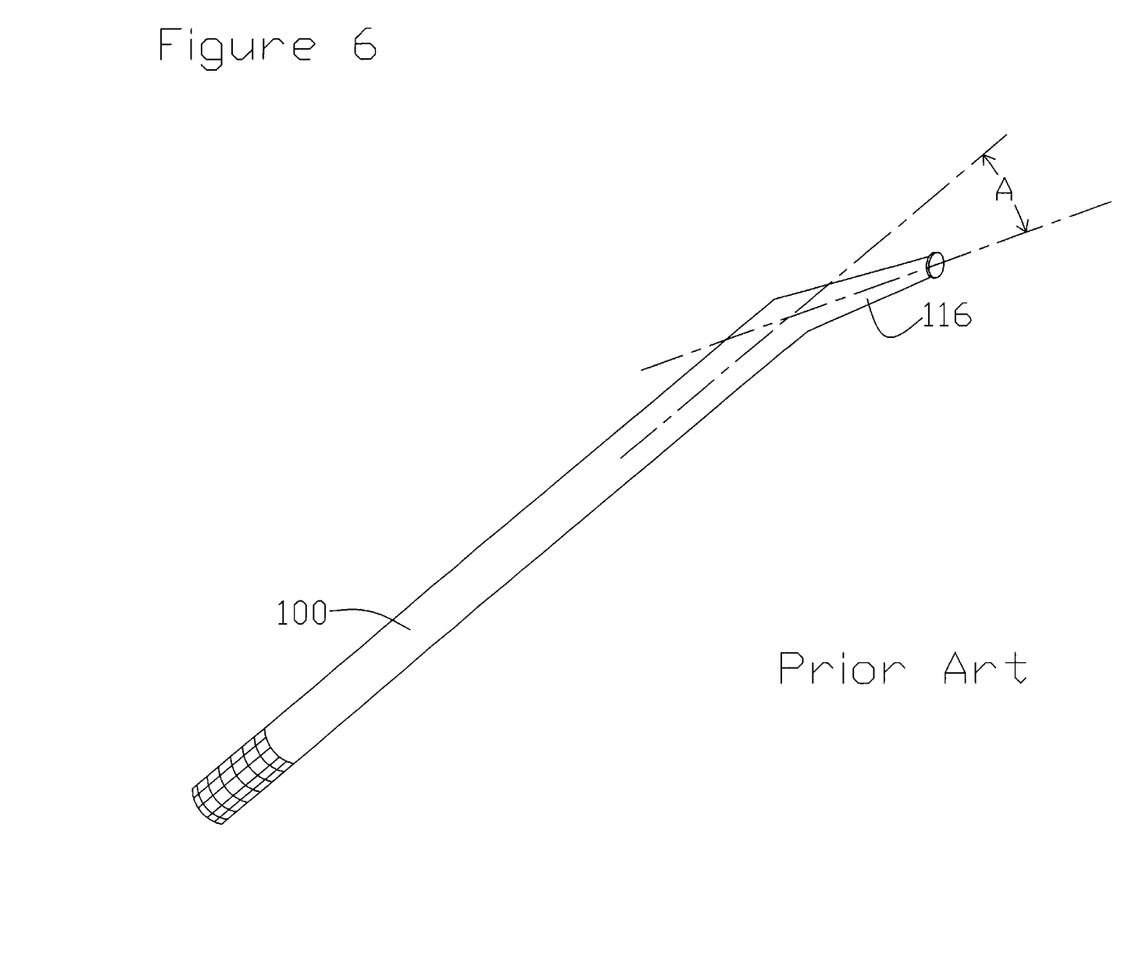
FIG. 6 Shows a typical prior art winch bar

FIG. 6 shows a typical prior art winch bar (100). This bar also includes an angle (A) near the tip (116). This angle (A) was designed into the bar (100) to allow it better access to the holes (H) in the winch lug (L) shown in prior figures. The angle leads to instability where the bar (100) can accidentally rotate about its long axis during the application of leverage by a user. Such an accidental rotation will lead to the user losing their balance and falling face first into either the bar or the side of the trailer.

Figure 7:
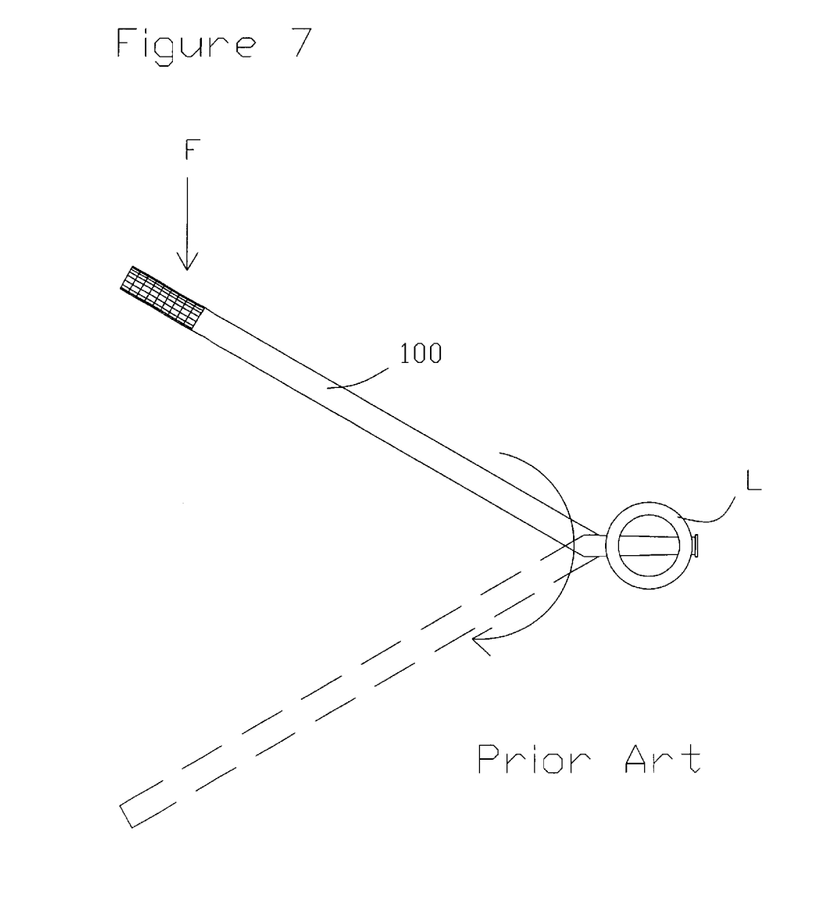
FIG. 7 Shows a second view of the prior art winch bar

FIG. 7 shows the movement in the bar (100) caused by the accidental rotation of the bar (100). As a force (F) is applied to the prior art bar (100) in its unstable position a slight variation will cause the bar (100) to rotate to its stable position (shown in phantom lines). This rotation, which occurs almost instantly, will cause the user to lose their balance and usually to fall very hard as they are unable to catch themselves as their hands are still on or are blocked by the bar (100). The unstable bar is likely to slip when the user is applying the most force to it.

Figure 8:
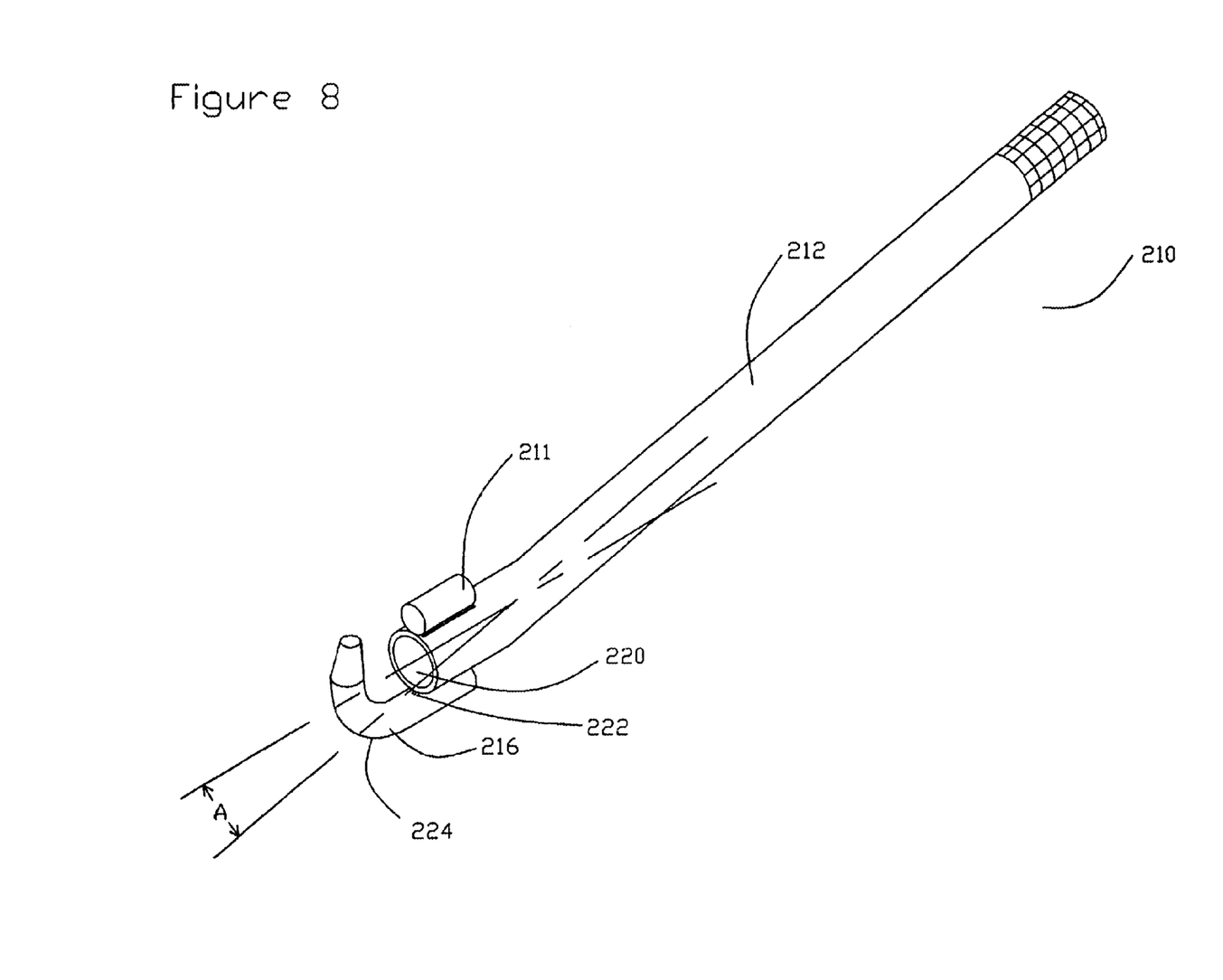
FIG. 8 Shows a second embodiment of the device

FIG. 8 shows an alternative embodiment of the winch bar device. A winch bar (210) includes a long handle (212) and tip section (216). This embodiment includes a cylindrical weldment (211). This weldment serves the same purpose as the flattened end section (20) of the other embodiment. The weldment (211) keeps the end (220) of the long handle (212) from slipping into the hole (H) of the winch (W) even after the hole (H) is elongated with use. This is only an issue when the end of the winch bar is in the position that the end of the long handle (212) bears against the lug (L). This embodiment includes a ninety degree bend (224) in the tip section (216) which is welded (222) to the long handle (212). This embodiment also includes the bend angle (A) near the end of the long handle (212).

Referring now to FIGS. 1–5, in use the winch bar tip section (16) is engaged through two adjacent holes (H) as shown in FIG. 2. Leverage is applied to the bar to rotate the winch lug (L) through about one quarter to one half turn. The tip section (16) is then pulled out of the hole (H) and placed in another hole (H). If desired for speed, leverage or accessibility the winch bar (10) can be rotated, when the tip section (16) is out of the lug (L), about its long handle (12) axis and the tip section (16) can engage a hole (H) in the stable position shown in FIG. 4. Each trailer (T) commonly has many winches (W). An advantage of the current device is that it can be rested on a rail (R), typically found on the side of flat bed trailers, between straps to be cinched. This is an improvement over the prior art bars which when laid down on a trailer parked on a slope would often roll away from the user out onto the trailer bed. Having thus described the device, what is claimed is:

What is claimed is:

1. A winch bar and strap winding winch combination, said strap winding winch having a cylindrical lug having means thereon to spool up a length of strap, said lug having a cylindrical wall, said cylindrical wall having a plurality of holes there through for applying a winding torque to said cylindrical lug, said winch bar comprising;

an elongated handle, a tip section attached to one end of said elongated handle said tip section having a first bend, said winch bar having a first torque applying position of engagement relative to said winch lug wherein the tip section passes through a first of said plurality of holes and into an adjacent of said holes;

and said winch bar having a second torque applying position of engagement relative to said lug wherein said tip section passes through only one of said plurality of holes.

2. The winch bar and strap winding winch combination of claim 1 wherein when said winch bar is in the first torque applying position said first bend is located within the cylindrical walled lug.

3. The winch bar and strap winding combination of claim 1 wherein the first bend is approximately 90 degrees.

4. The winch bar and strap winding combination of claim 1 wherein said elongated handle includes a second bend adjacent to the end where said tip section is attached.

5. A winch bar for use in combination with a strap winding winch, said strap winding winch having a cylindrical lug having means thereon to spool up a length of strap, said cylindrical lug having a cylindrical wall, said cylindrical wall having a plurality of holes there through for applying a winding torque to said cylindrical lug, said winch bar comprising;

an elongated handle, a tip section attached to one end of said elongated handle said tip section having a first bend, said winch bar having a first stable torque applying position of engagement relative to said winch lug wherein the tip section passes through a first of said plurality of holes and into an adjacent one of said holes; and said winch bar having a second stable torque applying position of engagement relative to said lug wherein said tip section passes through only one of said plurality of holes.

6. The winch bar and strap winding combination of claim 5 wherein the elongated handle is hollow and wherein said tip section is attached by welding.

7. A winch bar for use in combination with a strap winding winch, said strap winding winch having a cylindrical lug having means thereon to spool up a length of strap, said lug having a cylindrical wall, said cylindrical wall having a plurality of holes there through, equally spaced around a periphery of said lug for applying a winding torque to said cylindrical lug, said winch bar comprising;

an elongated handle, a tip section attached to one end of said elongated handle said tip section having a first bend, said winch bar having a first torque applying position of engagement relative to said winch lug wherein the tip section passes through a first of said plurality of holes and into an adjacent of said holes;

and said winch bar having a second torque applying position of engagement relative to said lug wherein said tip section passes through only one of said plurality of holes.

* * * * *